US010933927B2

(12) United States Patent
Nichols et al.

(10) Patent No.: US 10,933,927 B2
(45) Date of Patent: Mar. 2, 2021

(54) AIRFLOW DEFLECTOR FOR A VEHICLE

(71) Applicant: Honda Motor Co., Ltd., Tokyo (JP)

(72) Inventors: Larry Travis Nichols, Marysville, OH (US); Michael R. Missig, Powell, OH (US); Kurtis Ray Horner, Raymond, OH (US); Patrick G. Esber, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 16/414,232

(22) Filed: May 16, 2019

(65) Prior Publication Data
US 2020/0361545 A1 Nov. 19, 2020

(51) Int. Cl.
B60J 9/00 (2006.01)
B62D 35/02 (2006.01)

(52) U.S. Cl.
CPC .................... B62D 35/02 (2013.01)

(58) Field of Classification Search
CPC .... B62D 35/02; B62D 35/001; B62D 35/008; Y02T 10/88; Y02T 10/82; H01L 2924/0002; H01L 2924/00; G11B 2220/20; G11B 27/105; G11B 27/3027
See application file for complete search history.

(56) References Cited

U.S. PATENT DOCUMENTS

| 4,929,013 | A  | * | 5/1990  | Eke ........................... B60J 1/20 296/180.5 |
| 5,791,719 | A  | * | 8/1998  | Alley ....................... B60J 1/2005 296/91 |
| 7,198,139 | B2 | * | 4/2007  | Wilson ..................... F16D 65/78 188/264 AA |
| 7,854,469 | B2 |   | 12/2010 | Dayton |
| 8,276,973 | B2 |   | 10/2012 | Hasegawa et al. |
| 8,517,451 | B2 | * | 8/2013  | Kakiuchi ............... B62D 35/02 296/180.1 |
| 8,651,554 | B1 | * | 2/2014  | Patelczyk ............... B60R 13/04 296/136.08 |
| 8,668,245 | B2 | * | 3/2014  | Kakiuchi ............... B62D 35/02 296/180.1 |
| 8,991,544 | B1 | * | 3/2015  | Stratten .................. B60R 19/04 180/274 |
| 9,573,634 | B2 | * | 2/2017  | Ohira ..................... B62D 25/08 |
| 9,849,923 | B2 |   | 12/2017 | Caples et al. |

(Continued)

FOREIGN PATENT DOCUMENTS

| JP | 2007-253656 | 10/2007 |
| JP | 2009-202795 | 9/2009 |

(Continued)

Primary Examiner — Kiran B Patel
(74) Attorney, Agent, or Firm — Rankin, Hill & Clark LLP

(57) ABSTRACT

An airflow deflector for a vehicle protrudes downward from an inner fender having a wheel housing that houses a front wheel. The airflow deflector includes an airflow guide member extending in both a lateral direction and a vertical direction of the vehicle and provided in front of the wheel housing. The guide member has an inboard end portion and an outboard end portion. The inboard end portion is spaced inboard from an inner sidewall of the front wheel and the outboard end portion is spaced inboard from an outer sidewall of the front wheel. The outboard end portion includes a cutout to guide airflow around the outer sidewall of the front wheel.

20 Claims, 7 Drawing Sheets

(56) References Cited

U.S. PATENT DOCUMENTS

| | | | |
|---|---|---|---|
| 9,926,021 B2 * | 3/2018 | Han | B62D 35/02 |
| 10,086,885 B2 | 10/2018 | Zuhlsdorf et al. | |
| 2001/0040383 A1 * | 11/2001 | Lund | B60J 1/2005 |
| | | | 296/95.1 |
| 2006/0185199 A1 * | 8/2006 | Watros | E01H 5/066 |
| | | | 37/231 |
| 2012/0061993 A1 * | 3/2012 | Hasegawa | B62D 35/02 |
| | | | 296/181.5 |
| 2013/0244562 A1 * | 9/2013 | Maurer | F01P 11/10 |
| | | | 454/152 |
| 2015/0300434 A1 * | 10/2015 | Morales Perez | B62D 35/005 |
| | | | 188/264 A |
| 2016/0001727 A1 * | 1/2016 | Watterworth | B62D 25/04 |
| | | | 280/784 |
| 2017/0120731 A1 * | 5/2017 | Rose | B60J 1/2005 |
| 2017/0240222 A1 * | 8/2017 | Gaylard | B62D 35/007 |
| 2017/0291649 A1 * | 10/2017 | Zuhlsdorf | B60T 5/00 |
| 2017/0299006 A1 * | 10/2017 | Shi | F16D 65/78 |
| 2018/0025116 A1 | 1/2018 | Carrington et al. | |
| 2018/0162458 A1 * | 6/2018 | McMillan | B62D 35/008 |

FOREIGN PATENT DOCUMENTS

| | | |
|---|---|---|
| JP | 2010-047156 | 3/2010 |
| JP | 2010-167934 | 8/2010 |
| WO | 2016140053 | 9/2016 |
| WO | 2018150667 | 8/2018 |

* cited by examiner

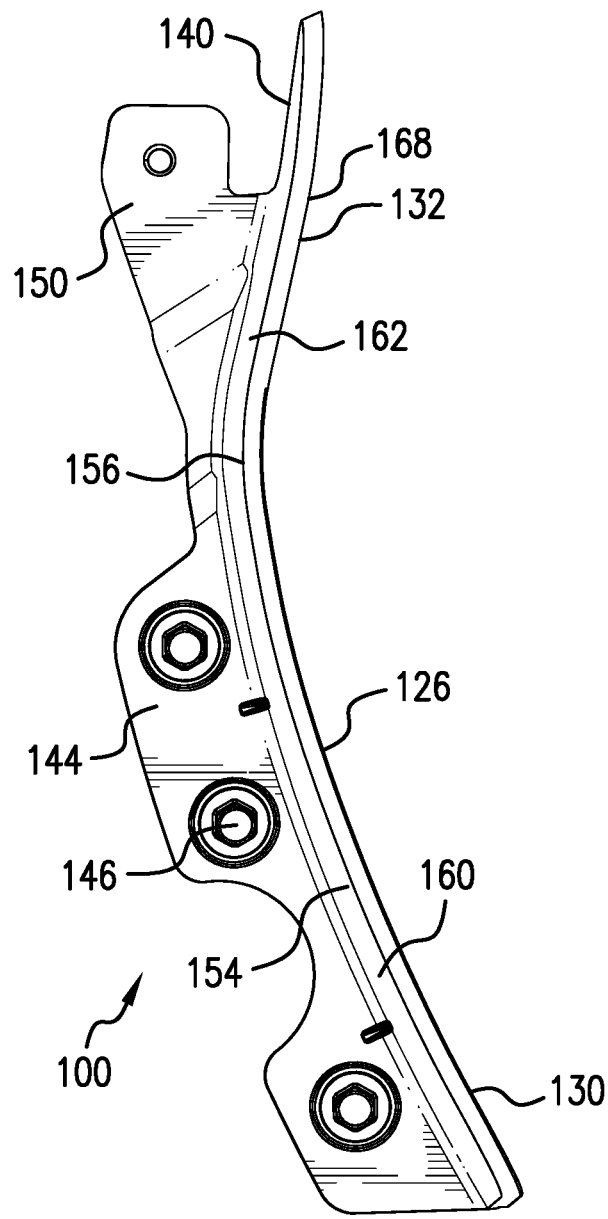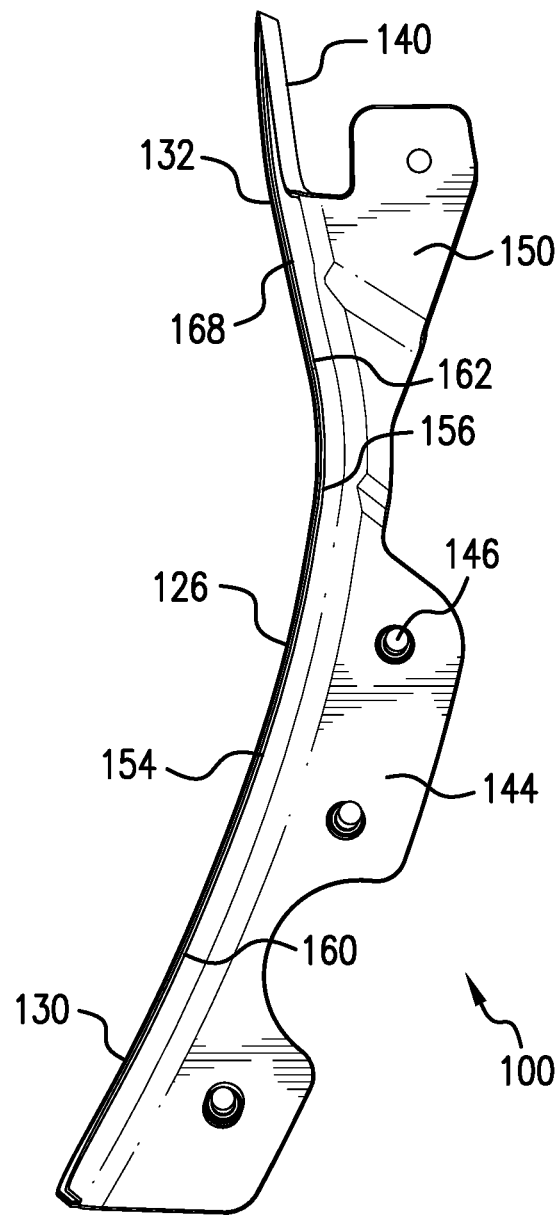

AIRFLOW DEFLECTOR FOR A VEHICLE

BACKGROUND

Airflow deflectors or wheel strakes for a vehicle are known. Typically, the airflow deflector is arranged in the region in front of a wheel housing that houses a wheel and projects downward in the direction of the road. The airflow deflector includes a guide member that receives airflow from the front and then laterally or downwardly redirects the airflow in order to prevent the airflow from striking the wheel and other rearward components, thereby reducing air drag of the vehicle.

BRIEF DESCRIPTION

According to one aspect, an airflow deflector for a vehicle protrudes downward from an inner fender having a wheel housing that houses a front wheel. The airflow deflector comprises an airflow guide member extending in both a lateral direction and a vertical direction of the vehicle and provided in front of the wheel housing. The guide member has an inboard end portion and an outboard end portion. The inboard end portion is spaced inboard from an inner sidewall of the front wheel and the outboard end portion is spaced inboard from an outer sidewall of the front wheel. The outboard end portion includes a cutout to guide airflow around the outer sidewall of the front wheel.

According to another aspect, an airflow deflector for a vehicle protrudes downward from an inner fender having a wheel housing that houses a front wheel. The airflow deflector comprises an airflow guide member extending in both a lateral direction and a vertical direction of the vehicle and provided in front of the wheel housing. The guide member has a flow surface curved in a forward direction of the vehicle with an inboard end portion and an outboard end portion. The flow surface includes an obliquely-outward angled portion directed toward an outer sidewall of the front wheel. The outboard end portion of the flow surface includes a cutout to guide airflow around the outer sidewall of the front wheel.

According to another aspect, an airflow deflector for a vehicle protrudes downward from an inner fender having a wheel housing that houses a front wheel. The airflow deflector comprises an airflow guide member extending in both a lateral direction and a vertical direction of the vehicle and provided in front of the wheel housing. The guide member has a flow surface curved in a forward direction of the vehicle. The flow surface includes an obliquely-outward angled portion positioned outboard of an apex portion of the curve defined by the flow surface and directed toward an outer sidewall of the front wheel. The obliquely-outward angled portion is provided with a cutout to guide airflow around the outer sidewall of the front wheel.

BRIEF DESCRIPTION OF THE DRAWINGS

FIGS. 5 and 6 are perspective views of the airflow deflector of FIG. 4.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
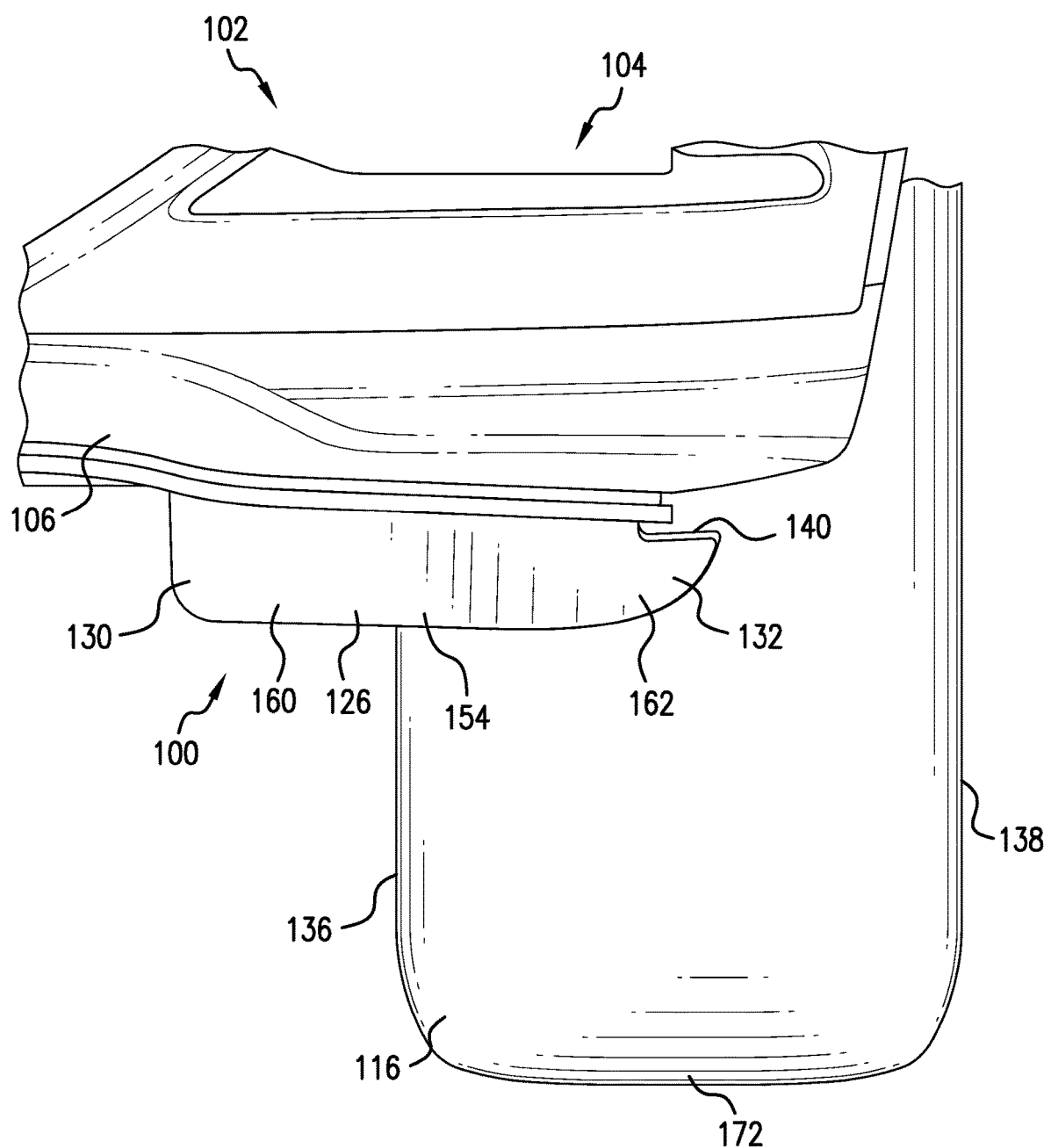
FIG. 1 is a partial front view of a vehicle depicting an exemplary airflow deflector protruding downward from an inner fender forward of a front wheel.
Figure 2:
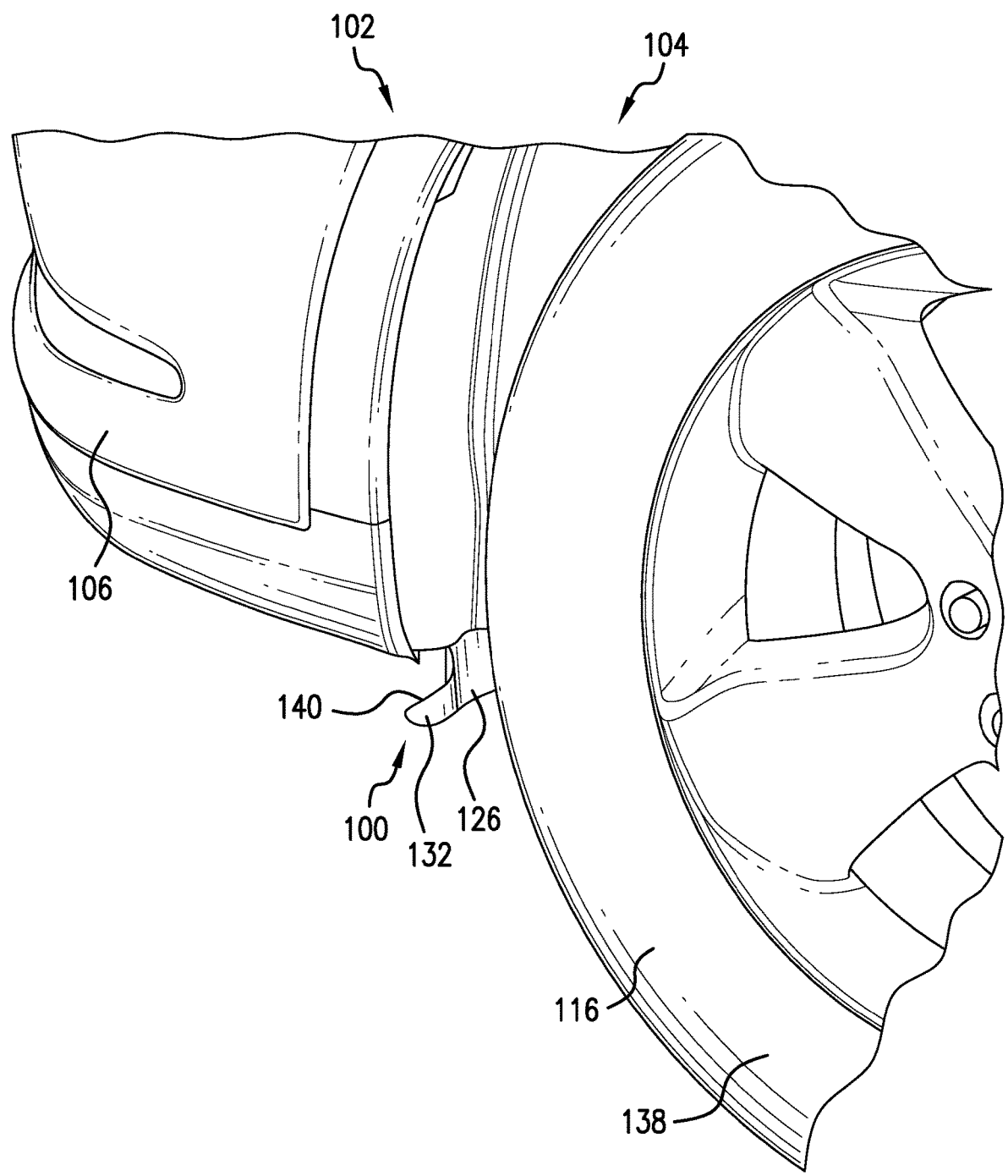
FIG. 2 is a rear perspective view of FIG. 1.
Figure 3:
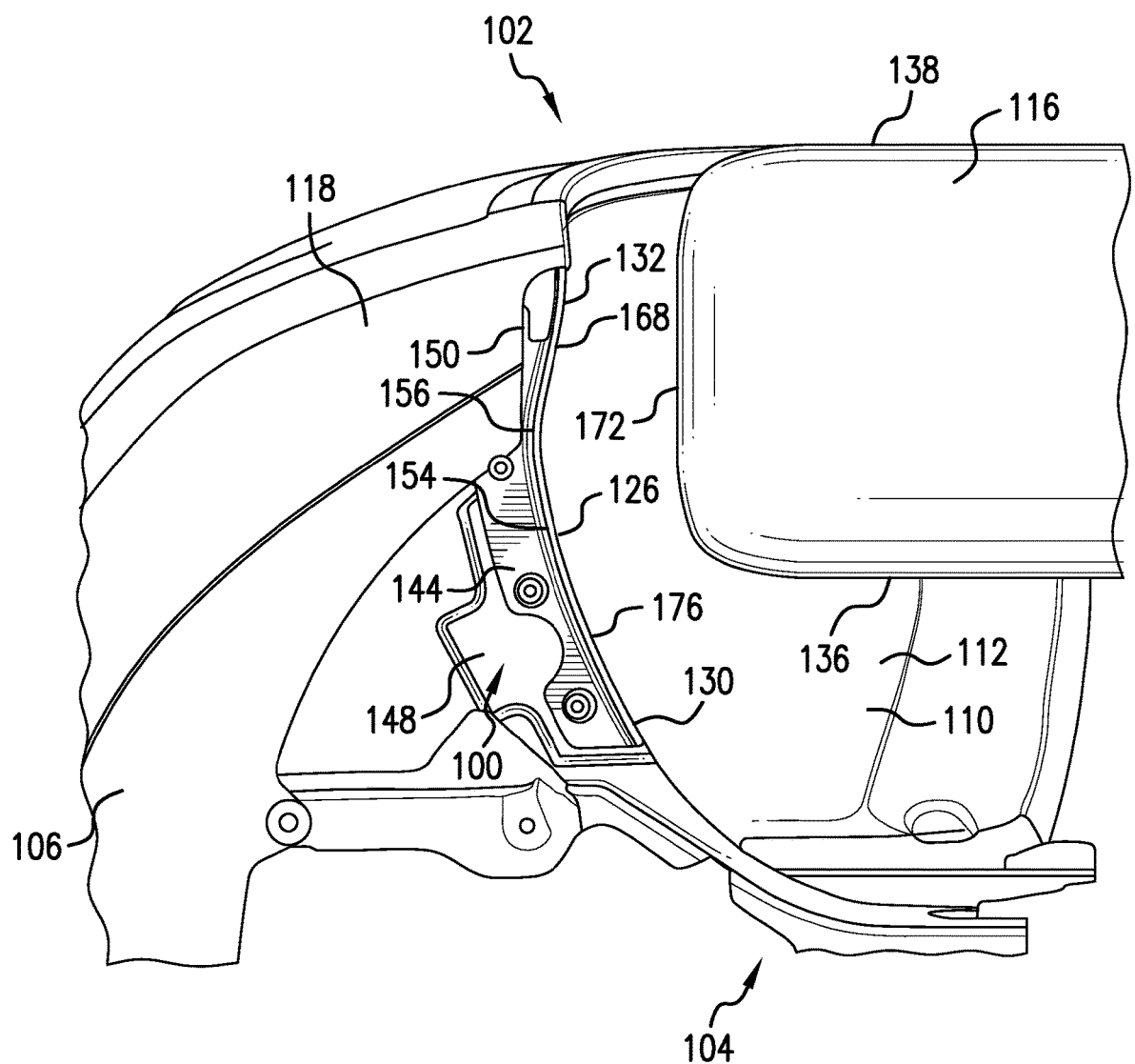
FIG. 3 is a bottom view of FIG. 1.

Referring now to the drawings, wherein like numerals refer to like parts throughout the several views, FIGS. 1-3 illustrate an exemplary airflow deflector or wheel strake 100 according to one aspect of the present disclosure mounted to an underside of a vehicle 102. It should be appreciated that the vehicle 102 can be any type, size and/or style of vehicle, including but not limited to a passenger car, a truck, a van, etc. The vehicle 102 includes a body 104 that extends along a longitudinal direction, between a forward end 106, i.e., a front of the vehicle 102, and a rearward end (not shown), i.e., a back of the vehicle 102. As described herein, the term vehicle body is used generically, and should be interpreted to include structural components of the vehicle 102, including a frame, exterior panels, and the like.

The forward end 106 of the body 104 includes a forward inner fender 110 that defines a wheel well or wheel housing 112 that at least partially houses a front wheel 116. The front wheel 116 is rotatably attached to the body 104 of the vehicle 102, as is known in the art. As depicted, the front wheel 116 is generally tucked within the wheel well 112 of the inner fender 110, such that only an exterior surface of the front wheel 116 is exposed. A skid garnish 118 can be mounted to the body 104 forward of the inner fender 110 for protecting an underside of the body 104. It should be appreciated that the vehicle 102 includes two forward inner fenders, one on opposing lateral sides of the vehicle, for housing two front wheels. Therefore, the disclosure below may be applied to both forward inner fenders, with the exemplary airflow deflector 100 mounted forward of each front wheel. It should also be appreciated that the teachings of the disclosure may be incorporated into rearward inner fenders of the vehicle as well, with the exemplary airflow deflector 100 mounted forward of each rear wheel, although not specifically described herein.

The exemplary airflow deflector or wheel strake 100 protrudes downward from the inner fender 110 forward of the front wheel 116. The airflow deflector 100 generally comprises an airflow guide member 126 extending in both a lateral direction and a vertical direction of the vehicle 102. As depicted, with a slope or curvature of the guide member 126 facing forward towards airflow when the vehicle 102 is traveling in the forward direction, the guide member 126 is configured to guide airflow around the front wheel 116 to improve aerodynamic performance of the vehicle. The guide member 126 has an inboard end portion 130 and an outboard end portion 132. In the depicted embodiment, the inboard end portion 130 is spaced inboard from an inner sidewall 136 of the front wheel 116 and the outboard end portion 132 is spaced inboard from an outer sidewall 138 of the front wheel 116. In the aspect shown in FIGS. 1-3, the outboard end portion 132 includes a cutout 140 to further guide airflow around the outer sidewall 138 of the front wheel 116. Further, the airflow deflector 100 comprises a mounting member 144 extending forward of the guide member 126 and configured to be secured to the inner fender 110. By way of example, the mounting member 144 can be provided with fasteners 146 for ease of installation. In FIG. 3, the mounting member 144 is received in a recessed portion 148 defined in the inner fender 110, with an outboard end section 150 of the mounting member secured above the skid garnish 118. This arrangement for the mounting member 144 within the recessed portion 148 can limit airflow turbulence that may be created by any airflow impacting the mounting member.

Figure 4:
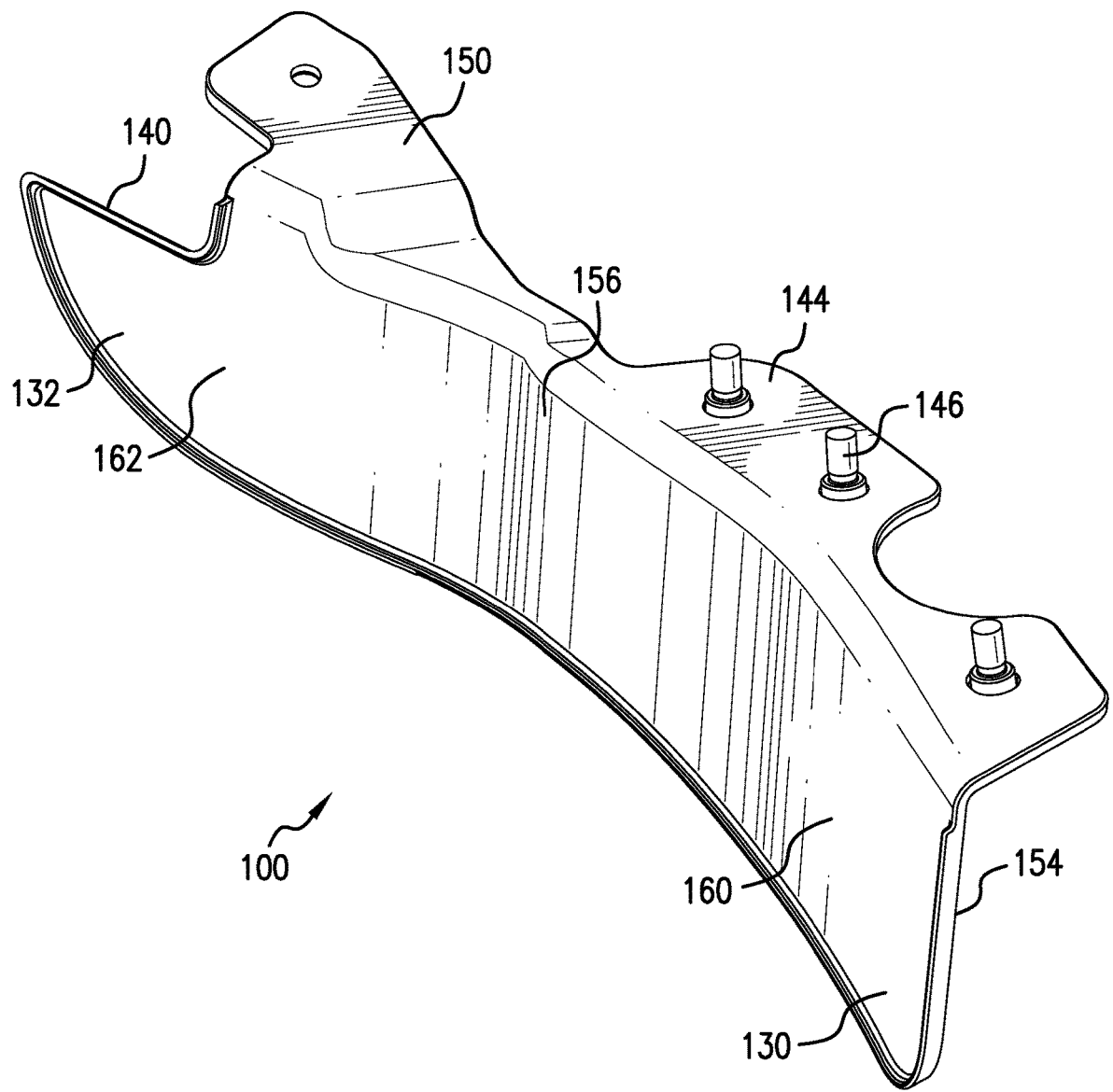
FIG. 4 is a perspective view of the airflow deflector of FIG. 1.

FIGS. 4, 5 and 6 depict the features of the exemplary airflow deflector 100. The airflow deflector 100 includes the guide member 126 and the mounting member 144. The guide member 126 includes a forward flow surface 154 that is substantially curved in the forward direction of the vehicle 102. The curve defined by the flow surface 154 defines an apex portion 156, which separates the flow surface into an obliquely-inward angled flow surface portion 160 inboard of the apex portion and an obliquely-outward angled flow surface portion 162 outboard of the apex portion. In the depicted aspect, the flow surface portion 160 extends continuously and without interruption from the apex portion 156 to the inboard end portion 130 of the airflow deflector 100. However, according to the present embodiment, while the flow surface portion 162 extends continuously from the apex portion 156 to the outboard end portion 132 of the airflow deflector 100, the flow surface portion 162 is interrupted by a kink or bend 168 near the outboard end portion 132. As shown in FIG. 3, this bend 168 slightly curves the flow surface portion 162 in the rearward direction of the vehicle so that the outboard end portion 132 of the guide member 126 extends substantially parallel to a tread surface 172 of the front wheel 116. Further illustrated in FIG. 3, the apex portion 156 of the curve defined by the guide member 126 is outboard of the inner sidewall 136 of the front wheel 116 and is positioned closer to the inner sidewall 136 of the front wheel 116 than the outer sidewall 138 of the front wheel. The curvature of the guide member 126 is also configured to follow a contour of a forward wall 176 of the wheel well 112, and the guide member 126 extends a majority of a lateral or width dimension of the forward wall 176 of the wheel well.

As described above, the outboard end portion 132 of the guide member 126 further includes the cutout 140. As shown, the obliquely-outward angled flow surface portion 162 is at least partially inboard of the cutout 140, and with the location of the cutout 140 in an upper section of the outboard end portion 132, the flow surface portion 162 extends beneath the cutout to an outermost end or edge of the guide member 126. This arrangement allows for airflow to be directed both laterally outward of the front wheel 116 and around the outer sidewall 138 of the front wheel 116. According to one aspect, the outboard end portion 132 which includes the cutout 140 is substantially triangular shaped in a front view of the guide member 126; although, this shape of the outboard end portion 132 is not required.

Figure 7:
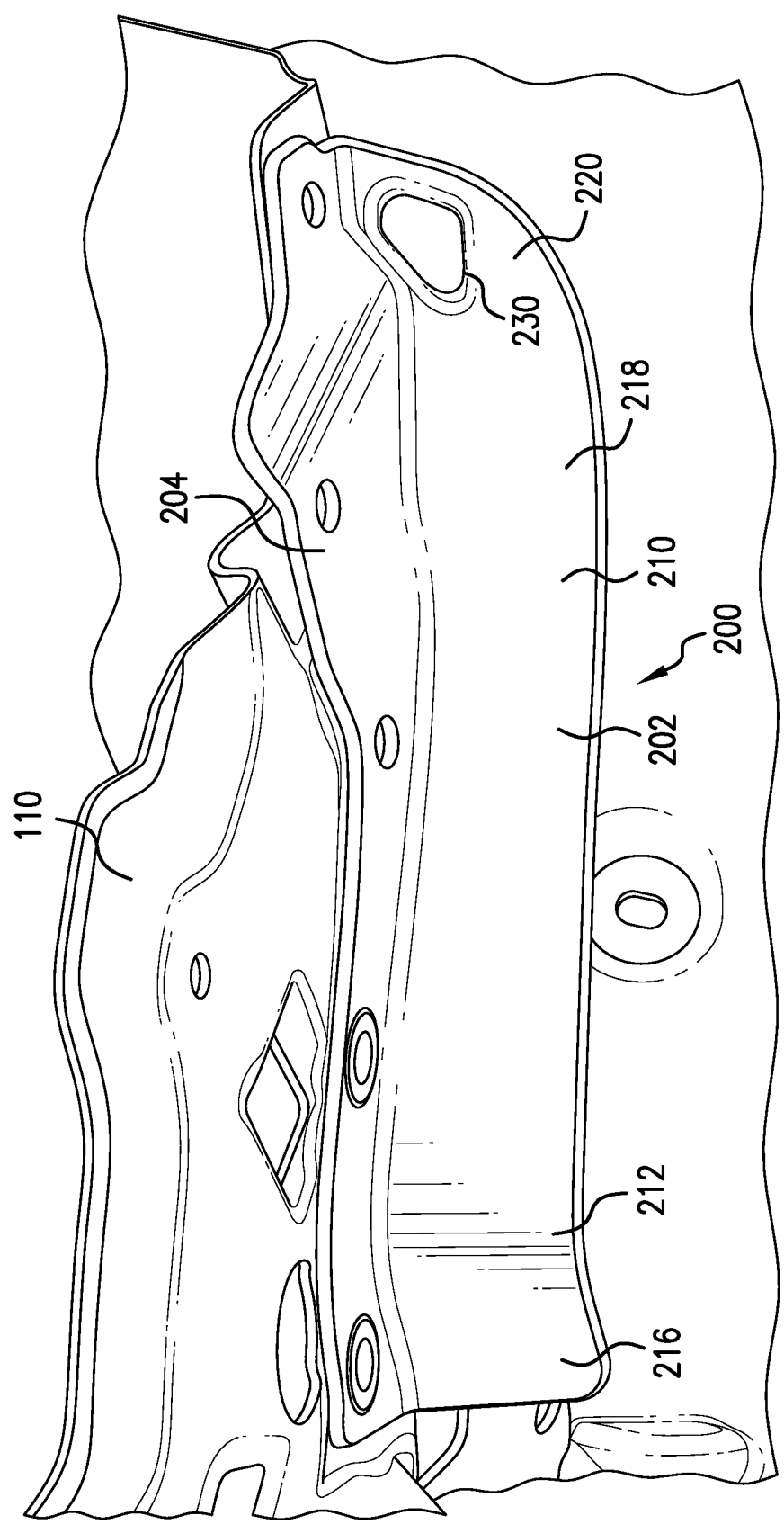
FIG. 7 is a partial front view of a vehicle depicting another aspect of an exemplary airflow deflector.
Figure 8:
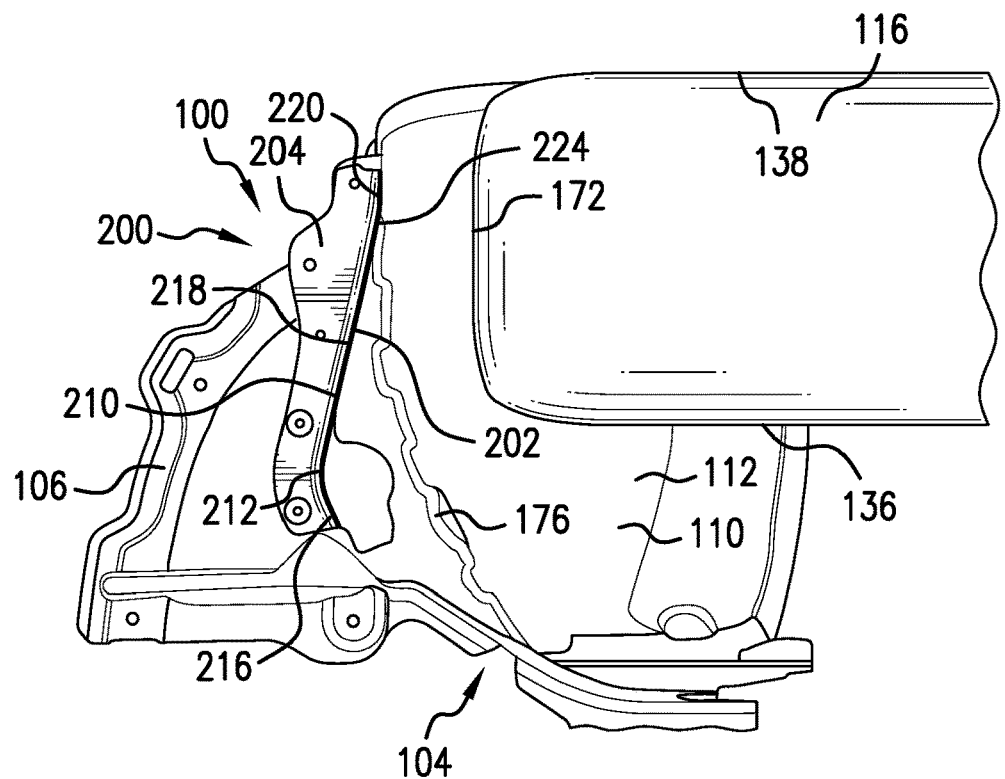
FIG. 8 is a bottom view of FIG. 7.

FIGS. 7 and 8 depict another aspect of an airflow deflector 200. The airflow deflector 200 includes a guide member 202 and a mounting member 204 for mounting the airflow deflector 200 to the inner fender 110. The guide member 202 includes a flow surface 210 that is substantially curved in the forward direction of the vehicle 102. The curve defined by the flow surface 210 defines an apex portion 212, which separates the flow surface into an obliquely-inward angled flow surface portion 216 inboard of the apex portion and an obliquely-outward angled flow surface portion 218 outboard of the apex portion. In the depicted aspect, the apex portion 212 is located inboard on the inner sidewall 136 of the front wheel 116. The flow surface portion 218 extends continuously from the apex portion 212 to an outboard end portion 220 of the airflow deflector 200, which is located inboard of the outer sidewall 138 of the front wheel 116. Similar to the embodiment described above, the flow surface portion 218 is interrupted by a kink or bend 224 near the outboard end portion 220 which orients the outboard end portion 220 substantially parallel to the tread surface 172 of the front wheel 116. The outboard end portion 220 further includes a cutout 230 to guide airflow around the outer sidewall 138 of the front wheel 116. As shown, the cutout 230 is bounded by the outboard end portion 220 of the guide member 202, meaning that the entire boundary of the cutout 230 is defined by the outboard end portion 220.

Figure 9:
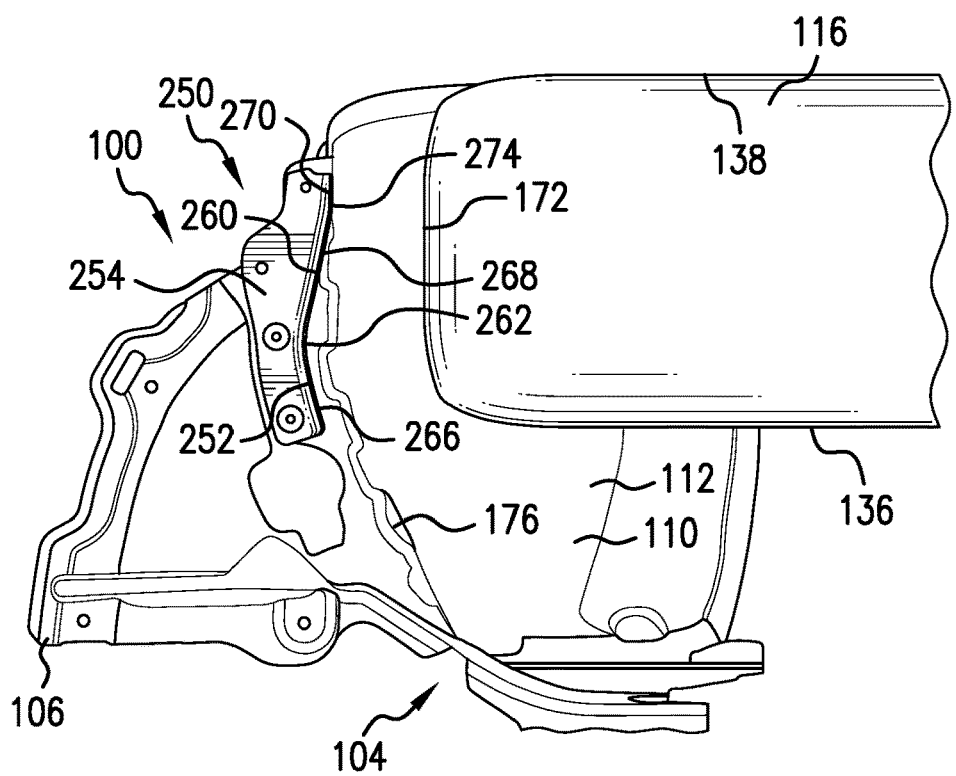
FIG. 9 is a partial bottom view of a vehicle depicting another aspect of an exemplary airflow deflector.

FIG. 9 depicts another aspect of an airflow deflector 250, which is similar to airflow deflector 200. Again, the airflow deflector 250 includes a guide member 252 and a mounting member 254 for mounting the airflow deflector 250 to the inner fender 110. The guide member 252 includes a flow surface 260 that is substantially curved in the forward direction of the vehicle 102. The curve defined by the flow surface 260 defines an apex portion 262, which separates the flow surface into an obliquely-inward angled flow surface portion 266 inboard of the apex portion and an obliquely-outward angled flow surface portion 268 outboard of the apex portion. Differing from the airflow deflector 200, the apex portion 262 is located outboard on the inner sidewall 136 of the front wheel 116. Similar to the embodiments described above, the flow surface portion 268 is interrupted by a kink or bend 274 near an outboard end portion 270 which orients the outboard end portion 270 substantially parallel to the tread surface 172 of the front wheel 116. The outboard end portion 270 of the airflow deflector 250, which is located inboard of the outer sidewall 138 of the front wheel 116, includes a cutout (not shown) to guide airflow around the outer sidewall 138 of the front wheel 116. The cutout is similar to the cutout 230, in that it is bounded by the outboard end portion 270 of the guide member 252.

It should be appreciated that any term of degree used herein, such as "substantially", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

It should also be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An airflow deflector for a vehicle that protrudes downward from an inner fender having a wheel housing that houses a front wheel, the airflow deflector comprising:
    an airflow guide member extending in both a lateral direction and a vertical direction of the vehicle and provided in front of the wheel housing, the guide member having an inboard end portion and an outboard end portion, the inboard end portion spaced inboard from an inner sidewall of the front wheel and the outboard end portion spaced inboard from an outer sidewall of the front wheel, the outboard end portion includes a cutout to guide airflow around the outer sidewall of the front wheel.

2. The airflow deflector of claim 1, including a mounting member extending forward of the guide member and configured to be secured to the inner fender.

3. The airflow deflector of claim 2, wherein the mounting member is received in a recessed portion defined in the inner fender.

4. The airflow deflector of claim 1, wherein the guide member is curved in a forward direction of the vehicle.

5. The airflow deflector of claim 4, wherein an apex portion of the curve defined by the guide member is outboard of the inner sidewall of the front wheel.

6. The airflow deflector of claim 5, wherein the guide member includes an obliquely-outward angled flow surface outboard of the apex portion.

7. The airflow deflector of claim 6, wherein the obliquely-outward angled flow surface is at least partially inboard of the cutout.

8. The airflow deflector of claim 4, wherein the curvature of the guide member follows a contour of a forward wall of the wheel housing, and the guide member extends a majority of a width dimension of the forward wall of the wheel housing.

9. The airflow deflector of claim 1, wherein the cutout is located in an upper section of the outboard end portion and extends to on outermost edge of the guide member.

10. The airflow deflector of claim 1, wherein the cutout is bounded by the outboard end portion of the guide member.

11. An airflow deflector for a vehicle that protrudes downward from an inner fender having a wheel housing that houses a front wheel, the airflow deflector comprising:

an airflow guide member extending in both a lateral direction and a vertical direction of the vehicle and provided in front of the wheel housing, the guide member having a flow surface curved in a forward direction of the vehicle with an inboard end portion and an outboard end portion, wherein the flow surface includes an obliquely-outward angled portion directed toward an outer sidewall of the front wheel, and outboard end portion of the flow surface includes a cutout to guide airflow around the outer sidewall of the front wheel.

12. The airflow deflector of claim 11, wherein an apex portion of the curve defined by the flow surface is outboard of an inner sidewall of the front wheel.

13. The airflow deflector of claim 12, wherein the obliquely-outward angled portion is positioned outboard of the apex portion.

14. The airflow deflector of claim 13, wherein the obliquely-outward angled portion extends beneath the cutout to an outermost end of the guide member.

15. The airflow deflector of claim 11, wherein the inboard end portion is spaced inboard from an inner sidewall of the front wheel and the outboard end portion is spaced inboard from an outer sidewall of the front wheel.

16. The airflow deflector of claim 11, including a mounting member extending forward of the guide member and configured to be secured to the inner fender, the mounting member is received in a recessed portion defined in the inner fender.

17. The airflow deflector of claim 11, wherein the guide member is curved in a forward direction of the vehicle, and the curvature of the guide member follows a contour of a forward wall of the wheel housing.

18. The airflow deflector of claim 11, wherein the outboard end portion which includes the cutout is triangular shaped in a front view of the guide member.

19. An airflow deflector for a vehicle that protrudes downward from an inner fender having a wheel housing that houses a front wheel, the airflow deflector comprising:

an airflow guide member extending in both a lateral direction and a vertical direction of the vehicle and provided in front of the wheel housing, the guide member having a flow surface curved in a forward direction of the vehicle, wherein the flow surface includes an obliquely-outward angled portion positioned outboard of an apex portion of the curve defined by the flow surface and directed toward an outer sidewall of the front wheel, the obliquely-outward angled portion provided with a cutout to guide airflow around the outer sidewall of the front wheel.

20. The airflow deflector of claim 19, wherein the apex portion is positioned closer to an inner sidewall of the front wheel than the outer sidewall of the front wheel.

* * * * *